June 7, 1932. O. E. MILLER 1,862,092
GRAIN HANDLING MACHINE
Filed July 22, 1930 2 Sheets-Sheet 1
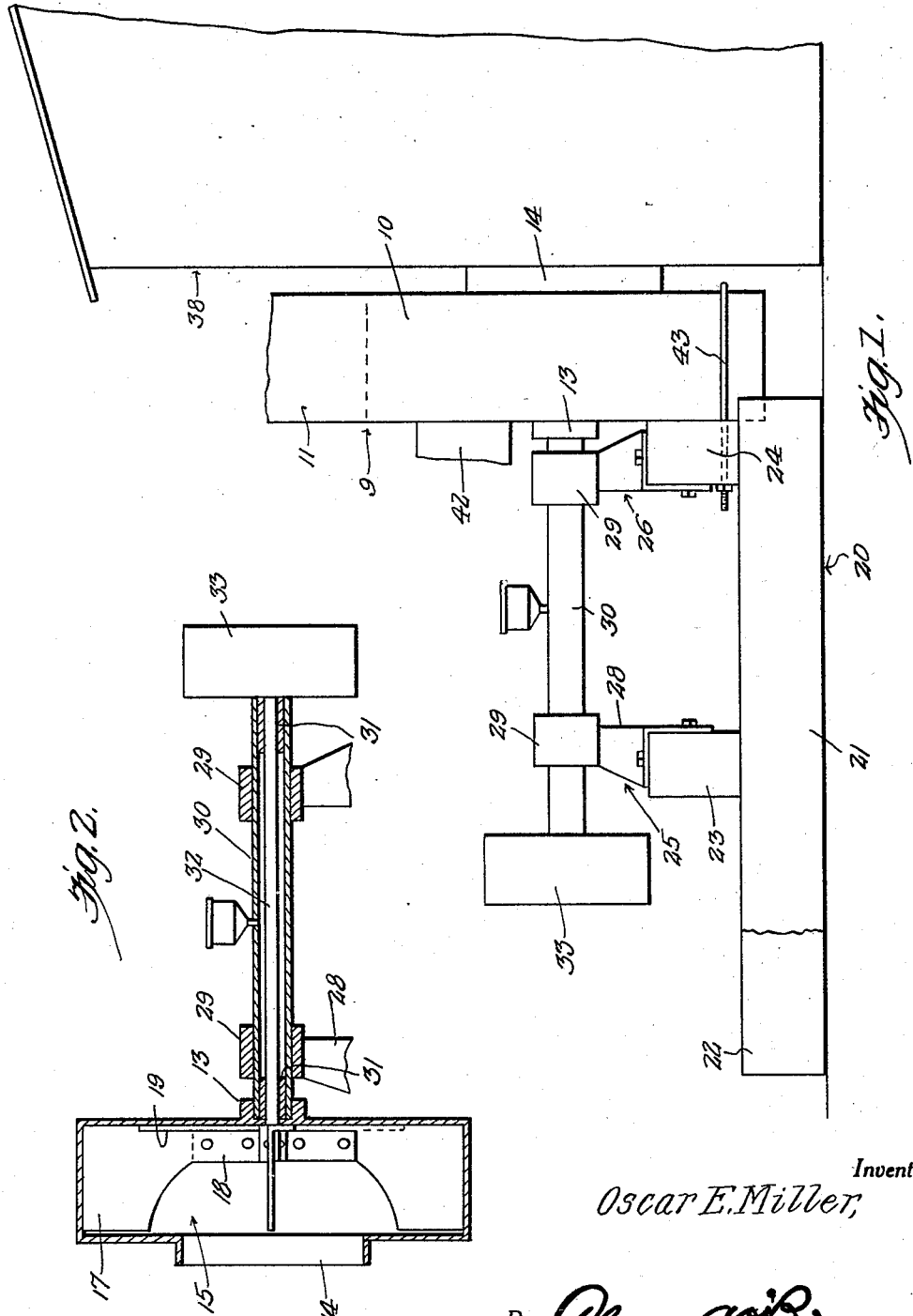
Inventor
*Oscar E. Miller*
By *Clarence A. O'Brien*
Attorney

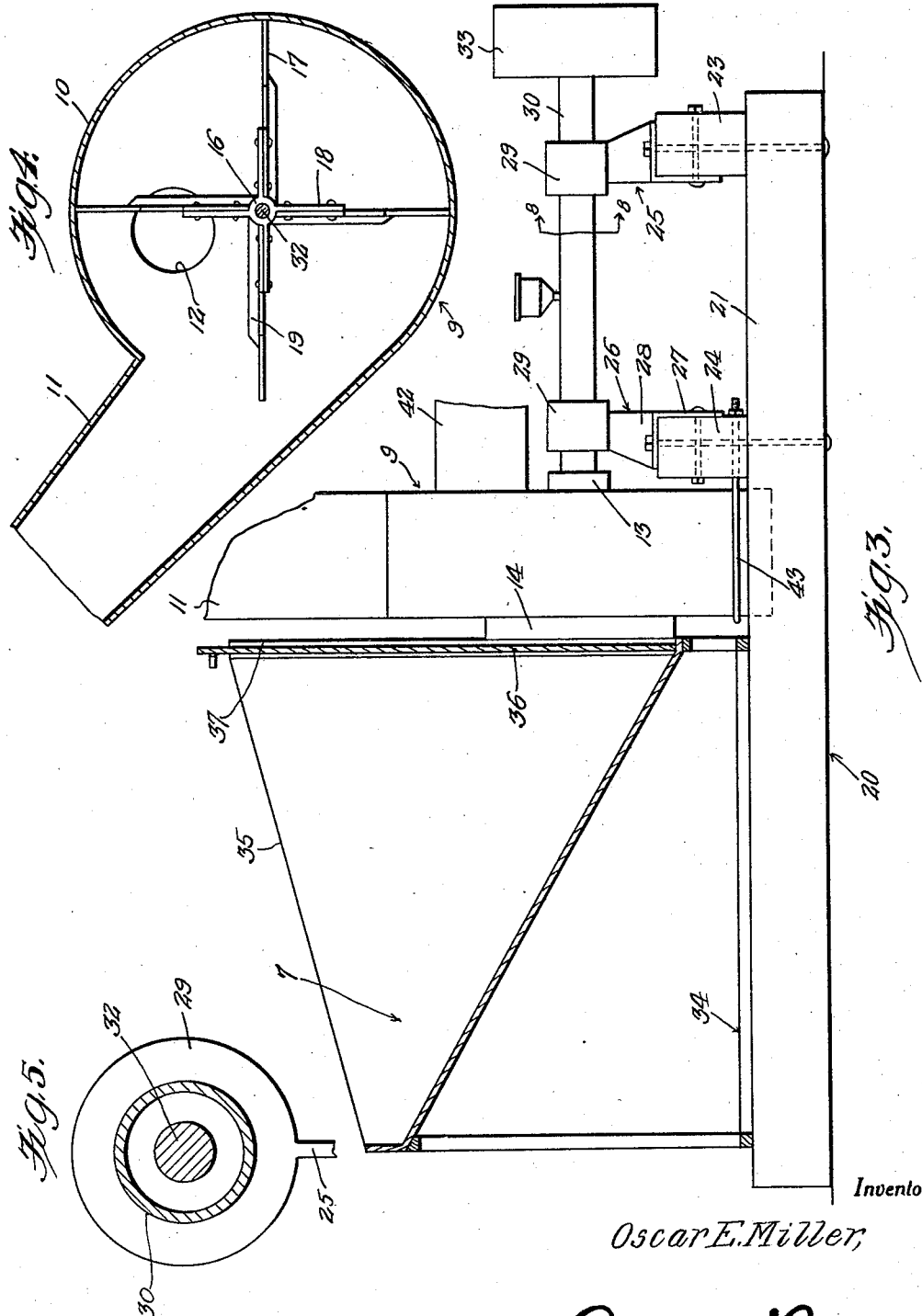

Patented June 7, 1932

1,862,092

UNITED STATES PATENT OFFICE

OSCAR E. MILLER, OF STRATTON, NEBRASKA

GRAIN HANDLING MACHINE

Application filed July 22, 1930. Serial No. 469,790.

This invention relates to an agricultural apparatus and machine for handling grain, and it has more particular reference to a convertible structure which is susceptible of diversified usage, especially adapted for handling grain harvested by the well known combine method which, as is well understood, usually ripens unevenly and consequently requires special conditioning.

Otherwise stated, it is an object of the present invention to provide a practical and economical labor saving machine for drying and elevating and otherwise handling grain, and it is especially adapted for handling grain harvested by the combine method which usually ripens uneven and leaves high moisture content in the grain.

One of the essential features of this novel contribution to the art is the fan-equipped blower and its especially designed housing, the physical properties of which are such as to permit the device to be adapted to fulfill several distinguishable purposes as will be hereinafter explained.

More specifically stated, one conception of the invention comprehends the provision of a base frame of appropriate construction having detachable and adjustable standards provided with bearings to accommodate a duplex journal and bearing construction which permits the housing of the blower to be adjusted with respect to the relatively stationary support for disposing the peripheral eduction conduit in various angular positions.

Numerous other points of interest, structural features and advantages producing commercially acceptable results will become more readily apparent from the following description and drawings.

In the accompanying drawings in which like numerals are employed to designate like parts throughout the same:

Figure 1 is a fragmentary elevational view showing one embodiment of the invention as developed and used for extracting material from a housing or storage bin or equivalent container.

Figure 2 is a view in section and elevation showing the duplex bearing construction for adjustment of the blower.

Figure 3 is a view in section and elevation showing a feed hopper associated with the blower for grain elevating purposes.

Figure 4 is a sectional and elevational view through the blower itself.

Figure 5 is a detail cross section on the line 8—8 of Figure 3.

The convertible blower comprises a composite structure which is generally represented throughout the drawings by the numeral 9. As shown it comprises a somewhat circular hollow housing or casing 10 having a peripheral conduit 11 projecting laterally from one side thereof at a predetermined point.

In the back wall is an air intake port 12. Below this and concentrically arranged is a bearing socket 13. Incidentally it will be noted that the port 12 is located in close proximity to the outlet or eduction conduit 11 and eccentrically with respect to the feature 13. Concentrically arranged on the opposite side wall of the housing is a main material inlet generally represented at 14 in Figure 2.

The internal bladed rotor is denoted as a unit by the numeral 15. It comprises a spider-like hub 16, the arms of which are attached to the especially fashioned blades. There are four of these blades and each blade comprises a relatively wide outer end portion 17 constituting a propelling element and an inner reduced shank portion 18 fastened to the adjacent arm of the spider. That edge of each blade located in proximity to the opening 12 is formed with a lateral flange 19 whose proportions and angularity may be slightly varied to suit conditions.

At this point I desire to mention the supporting base 20 which is here shown as comprising a pair of spaced parallel rails 21 and 22 connected together through the medium of transverse cross pieces 23 and 24 respectively. Standards 25 and 26 are attached to the cross pieces. Each standard comprises a right angular attaching foot 27 detachably bolted in place and an upright 28 having a bearing collar 29 at its upper end.

As shown in Figure 2, a tubular adjusting shaft 30 is mounted for oscillation in the bearings 29, the shaft extending into and integrally connected with the socket 13, so that it is adjustable as a unit with the blower. Located in this shaft are bushings 31 forming bearings for the solid propeller shaft 32. The outer end of this shaft 32 is provided with a pulley or equivalent power supply means 33.

The inner end of shaft 32 projects into the housing and is fastened to the aforesaid spider, whereby to propel the bladed rotor. Particular attention is called to this arrangement which permits the housing and its associated shaft 30 to be adjusted as a unit independently of the propeller shaft and pulley. The main purpose of this arrangement will be made evident later in the description.

In using this assembly for grain elevating purposes, I call attention to Figure 3, wherein it will be noted that the numeral 34 represents a suitable supporting frame removably mounted on the aforesaid rails of the base structure and carrying an appropriately constructed material containing hopper 35. The hopper is provided at its discharge end with vertical guides 36 accommodating a slidable shutter plate 37.

This permits the hopper to be arranged in communicating relationship with the centralized concentric grain intake 14 so that when the device is set in operation the grain will be lifted by the blower into an appropriate storage bin, collection receptacle or the like (not shown).

By reversing the standard arrangement and positioning the device against a grain containing shed, bin or the like 38, as shown in Figure 1, the identical structure may be employed for extracting or removing material from the shed 38.

Particularly do I wish to emphasize this interchangeable and reversible relationship of parts permitting this double usage of the identical structure for almost reverse purposes.

The means by which the blower housing is held secure at any desired angle is obtained by the U-clamp 43 extending around the blower housing. If the eduction pipe of the blower is desired at any particular location, such adjustment can be accomplished by loosening the U-clamp.

It will also be noticed that there is a space between the shaft and the outer wall of the tubular bearing. This space is used as a pocket to contain lubricant and will feed such lubricant to the high speed bearings.

To further aid the efficiency of my blower elevator I have located the air intake at the point just past the eduction which is very important in order to get the maximum capacity with a minimum amount of power. If the air intake were located at any other location on the blower housing it can be easily understood that the space between the eduction and the air intake would be dead space.

The air as it enters this air port has the entire circumference of the blower to travel, consequently by the time it reaches the eduction or the point where it comes in contact with the grain it will have attained a very high velocity thereby blowing the grain at the same time the fan blades come in contact with such grain which adds greatly to the capacity of elevation and also further reduces the possibility of cracking the grain by the whipping or pounding of the fan blades.

Furthermore, there is less air pressure at the point of location as the nearer the air reached the eduction the greater will be the air pressure due to the centrifugal force and velocity of the air. Consequently it is easily understood that if the intake were located at any other point, or near the eduction it would reduce the air pressure and cut the efficiency of the blower.

Another object in view in locating the air at this particular point just past the eduction or discharge is to concentrate all the air at the extreme circumference of the blower with a uniform air pressure when it comes in contact with the grain. It is also very easily understood that if the air intake were located at the center of the fan the centrifugal force of the fan would draw air into the blower and force such air to the rim of the blower at all angles and such air as is taken nearest the eduction would not have the same velocity as the air that is drawn by the fan after it has just passed the eduction and permitted to travel the entire circumference of the blower, consequently there being a great saving of power in concentrating the air and giving it just as much distance to travel before it comes in contact with the grain as the greater the distance any object has to travel to attain a given velocity the less power is required to move it.

Owing to the nature of the fan which I have designed to use in connection with my blower drier elevator it is very important that the air intake be located on the side opposite where the grain enters the fan compartment. The fan blades are so designed as to serve a compound purpose. The edge that is bent forward in the way of rotation serves as a suction blade drawing the air into the fan compartment at the air intake and the outer end of said blade being flat which serves as an impeller fan blade.

It is also bent forwardly and this serves as a reinforcement to the blade. You will also notice that the flat portion of the fan blades are below the opening through which the grain enters the fan. The object in view is to permit the grain to enter the fan compartment as far from the center as possible. Furthermore, by designing the fan blades in this manner it reduces the resistance in moving the air and grain.

During experiments I have found that a blower with my compound fan as described and illustrated has a capacity of approximately forty per cent more than a fan with a straight flat blade cut on an angle from the center and extending to the outer portion of the blade. By locating the air intake opposite to where the grain enters it will be easily understood that the edge bent forward never comes in contact with any grain.

It is clearly understood that the grain is preferably taken into the fan compartment or blower housing at the center. The grain will strike the rim of the blower at a given point regardless of the angle to which the eduction is placed. Consequently it is very important to locate the eduction pipe at such a point as to receive the grain direct into the throat of said eduction as it leaves the blades of the fan.

This feature of tilting the blower is indispensable for the elevation of grain that is easily cut or cracked such as corn, maize, etc., and by tilting the blower as illustrated the cracking of grain is reduced to a minimum. It has been considered heretofore that the fan within a blower is responsible for the cracking of grain in elevating by air blast.

This is true to a certain extent but the primary cause for cracking grain is based on the fact that as the grain leaves the fan blades it has a high velocity and will strike the rim of the blower a hard blow retarding the grain and at the same time permitting the fan to strike the grain by the extreme ends of the blades until it has again attained the velocity of the fan and air.

On the other hand, if the eduction pipe were located at the point the grain would enter the eduction by the centrifugal force of the fan and velocity of the air and never crack any grain. This feature is accomplished by loosening the U-clamp and adjusting to the desired point on which I claim invention.

The tilting means of my blower is necessary to serve all purposes required to successfully handle all kinds of grain. It is understood that wheat harvested by a combine if somewhat green or immature will contain a large percentage of white caps (commonly called hulls) and these hulls or white caps can be removed in my blower elevator as the eduction pipe can be tilted to a preferred angle as described and illustrated permitting the grain to strike the rim of the blower retarding the grain and allowing the fan to pound and hammer the grain thereby removing the hulls or white caps and blowing them out in elevation.

All beards on barley can be removed in like manner which would be impossible if such grain entered the eduction pipe as it left the fan and the necessity of the tilting device can be very easily understood. To remove hulls, beards, etc., the fan must pound the grain and to incorporate the feature of eliminating the cracking and pounding of grain that is easily cracked the same is accomplished by adjusting the angle of the blower eduction in relation to the point in which the grain strikes the rim of the blower as it leaves the fan on which I claim invention.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

A blower apparatus of the class described comprising a circular casing having flat sides with a concentric opening in one side, a cylindrical part attached to said side of the casing and surrounding the opening, a shaft extending into the casing from the opposite side with the opening concentric to the shaft and said opposite side of the casing having a small air opening therein arranged above the shaft and having its center located slightly to one side of a plane passing vertically through the center of the casing and said casing having a tangentially arranged outlet opening, the upper wall of which is arranged in front of the air opening, blades carried by the shaft and arranged in the casing, a base, a pair of uprights carried by the base and having bearings at their upper ends, a tubular shaft supported for sliding and rotary movement in the bearing, bearings in the tubular shaft for the first mentioned shaft which passes through the tubular shaft and means for connecting one end of the tubular shaft to the casing and means for connecting the casing with one of the uprights.

In testimony whereof I affix my signature.

OSCAR E. MILLER.